June 2, 1925.

W. P. CRESSWELL

BABY CARRIAGE

Filed May 26, 1923

1,540,256

INVENTOR
Walter Percy Cresswell
By Byrnes, Stebbins & Parmelee
His Attys

Patented June 2, 1925.

1,540,256

UNITED STATES PATENT OFFICE.

WALTER PERCY CRESSWELL, OF LONDON, ENGLAND.

BABY CARRIAGE.

Application filed May 26, 1923. Serial No. 641,547.

*To all whom it may concern:*

Be it known that I, WALTER PERCY CRESSWELL, British subject, accountant, residing at Harringay, London, England, have invented certain new and useful Improvements in Baby Carriages, of which the following is a specification.

This invention is for improvements in or relating to baby-carriages and has for its main object to provide a compact and simple form of carriage or chair in which a child, particularly a baby unable to walk but capable of exercising pressure with its feet, can transport itself with perfect safety along the ground with the aid of its feet but without bearing the weight of its body on its legs. Children's vehicles of the hobby-horse class are, of course, well known; in these a front steering wheel is usually carried on an extension piece from the seat proper and the child sits astride.

According to the present invention a baby-carriage, for the above purpose, comprises a seat without a front extension piece, but provided with wheels or equivalent devices arranged to lie substantially behind the legs of a child sitting on the seat, said seat being at such a height from the ground, when the wheels are in contact therewith, that the carriage can be propelled by the feet of a child thrust against the ground when sitting on the seat.

Preferably, a back-rest and arms on the seat are detachable from, or collapsible on, the seat so that the carriage may be rendered compact for transport purposes.

Other features of the invention will be hereinafter described and pointed out in the claims.

In the accompanying drawings which illustrate a preferred construction of carriage according to this invention:

Figure 1:
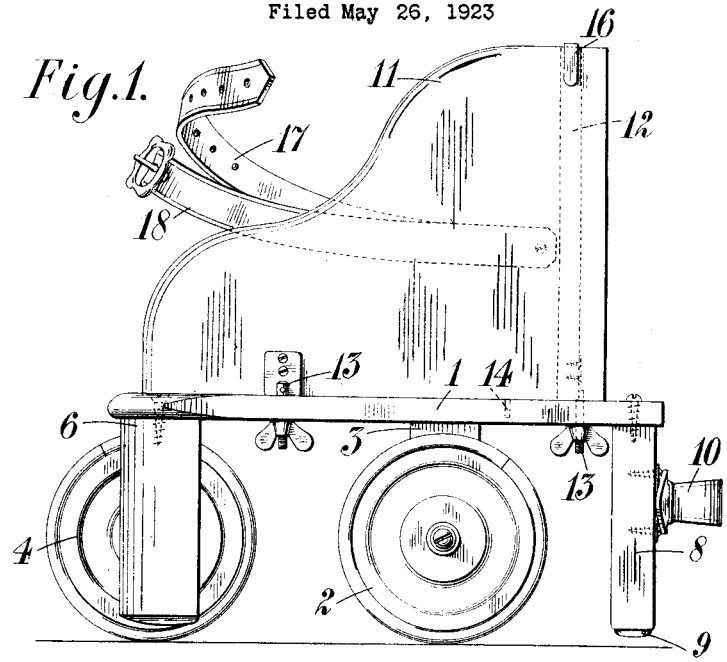
Figure 1 is a side elevation of the carriage.
Figure 2:
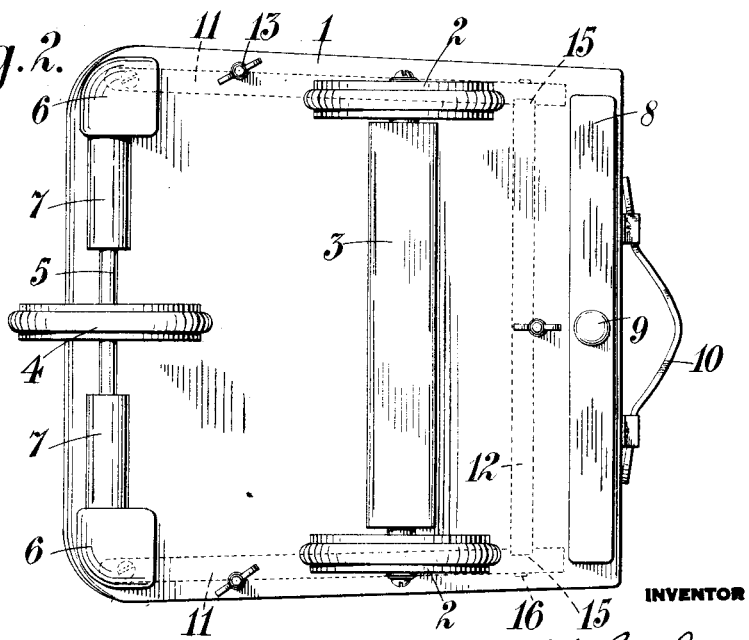
Figure 2 is an underneath plan of same.

A platform or seat 1 is provided with three rubber-tired wheels of which a pair 2, 2 is pivoted on the ends of an axle-beam 3 secured to the underside of the seat and a single wheel 4 is floating on an axle 5, the ends of which are secured in a pair of legs 6. These legs may be sloped so that the lower ends are forward of the upper ends. Distance pieces 7 on the axle limit the axial movement of the wheel. This movement of the wheel 4 enables the carriage to be readily steered.

The bottom of the legs 6 are normally just clear of the ground, as shown, and act as stops when the carriage is tilted. Beneath the back edge of the seat at the rear of the wheels 2 is a buffer beam or support 8 which carries on its lower edge a smooth metal skid 9 which also is normally clear of the ground, but which comes into contact therewith when the car is tilted slightly backwards. A strap handle 10, secured to the support 8, is provided for convenience in carriage.

Arms or sides 11 and a back 12 are detachably secured to the seat by means of the wing nuts and fittings 13 and dowel pins 14 on the arms engaging holes in the seat. The arms are provided with grooves 15 in which the back 12 fits and metal angle-pieces 16 are secured to the top corners of the back and engage the top edges of the arms, thus tying them securely to the back. Straps 17 and 18 secured one to the inside of each arm, are provided for securing the child in the carriage.

What I claim as my invention and desire to secure by Letters Patent is:

1. In a baby carriage, the combination with a platform and a pair of wheels situated beneath the central portion of the platform but towards the rear thereof, of an axle situated transversely beneath the front end of the platform, a single wheel rotatable about and slidable axially along said axle, which wheels are arranged to support the platform at such a height from the ground that the carriage can be propelled by the feet of a child thrust against the ground when seated on the platform, and a plurality of stops depending from said platform, two of which stops are in the form of short legs at the extreme front end and a third is in the form of a buffer-beam at the extreme rear end of the platform, substantially as described.

2. A baby carriage comprising in combination a platform constituting a seat, a back-rest and side arms detachably mounted thereon, a pair of short legs at the front end of the platform, an axle carried by said legs, a steering wheel rotatable about and slidable axially along said axle, a pair of wheels mounted underneath the central portion of the platform but towards the rear end thereof, and a support depending from the platform at the rear of said pair of wheels, said legs and support being normally clear of the ground, and said platform being carried by the wheels at such a height from the ground that the carriage is adapted to be propelled by the feet of a child thrust against the ground when seated on the platform, substantially as described.

In testimony whereof I affix my signature.

WALTER PERCY CRESSWELL.